Patented Aug. 22, 1950

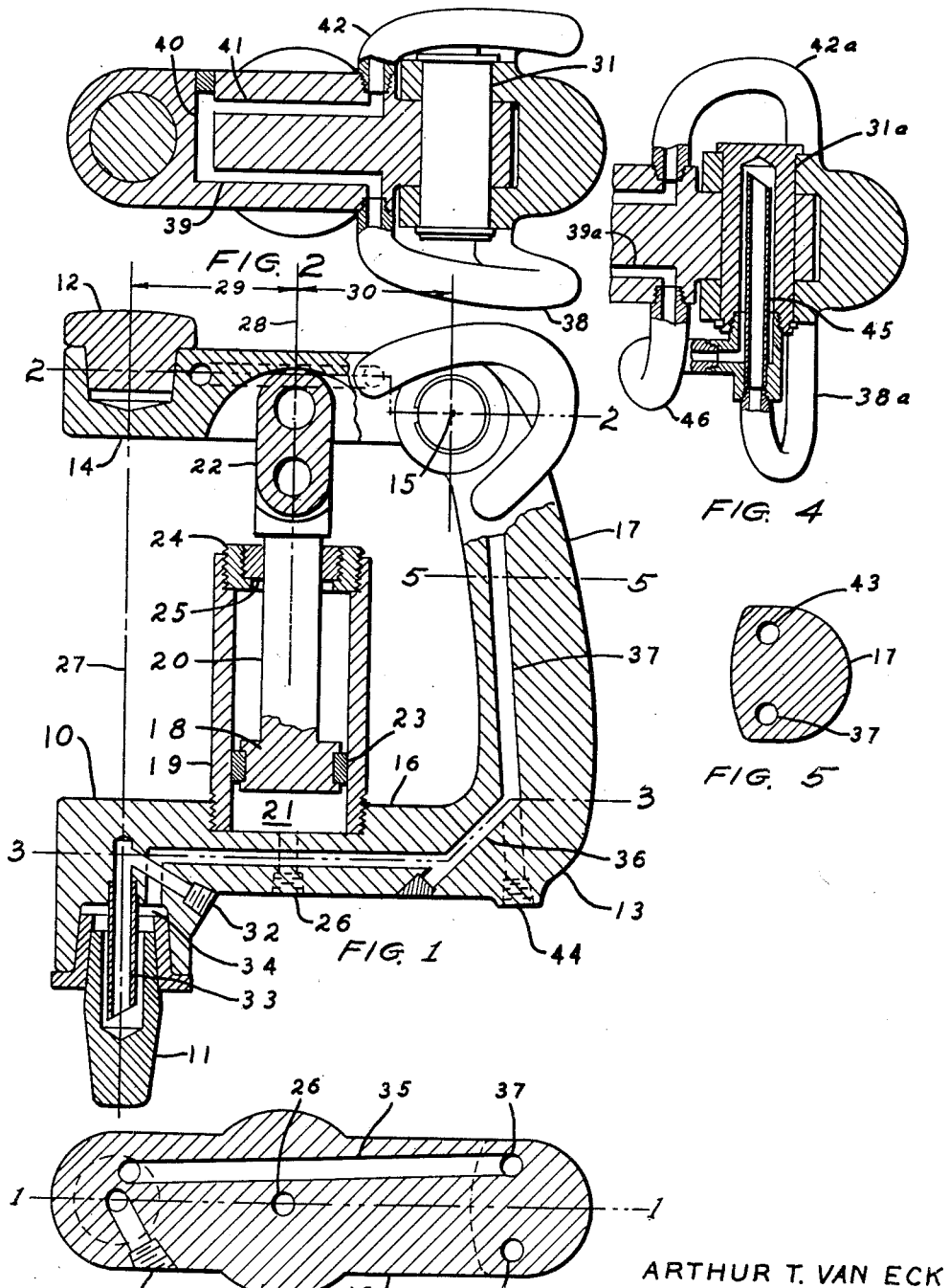

2,519,614

UNITED STATES PATENT OFFICE 2,519,614

WELDING GUN

Arthur T. Van Eck, Grand Rapids, Mich.

Application January 29, 1948, Serial No. 4,990

5 Claims. (Cl. 219—4)

This invention is an improvement in bar-welding equipment. The process known as bar-welding has developed as a specialized form of the more widely known process termed "spot-welding." This latter process may be defined as the attachment of relatively thin sheets of metal by welds which are formed at one or more points by electrodes which cause the appropriate welding current to pass through the material while holding it under a definite amount of pressure. Whenever it is desirable to utilize the spot-welding technique on the central areas of large sheets of metal, the conventional spot-welding machine becomes inadequate for the task due to the inability of the arms of the machine holding the electrodes to reach all of the positions, unless the machine is exceptionally large. Since the conventional supporting arms act as cantilever beams and carry considerable load, the cost and bulk of such machines becomes objectionable.

To handle this type of case, the technique of bar-welding has developed which consists essentially of establishing a conducting plate which operates as, or in conjunction with, a structural member of sufficient rigidity to withstand whatever welding pressure is required. This combined conductor-structural member is frequently in the form of a heavy copper bar or sheet which is placed a short distance above the location where the welds are to be formed. The work pieces are likewise supported upon a structural member acting as, or in conjunction with, a current-carrying member, and a circuit is completed between the two current-carrying members by a movable expanding conductor which has the two-fold function of carrying current and creating the necessary welding pressure. The conventional form of this conductor employs the use of either compressed air or hydraulic pressure for generating a force between the electrodes. This movable conductor is also conventionally formed with a hand grip equipped with manual controls for initiating the cycling mechanism associated with the welder. The means for utilizing hydraulic or pneumatic pressure for generating the welding pressure have conventionally included systems which are analogous to the usual hydraulic jack, and include the usual piston and cylinder. It is of course necessary to provide a path for the flow of electric current either through or around the pressure-creating mechanism, and numerous devices for accomplishing this have been developed. The present invention is particularly concerned with the problem of conducting the welding current around the pressure-creating mechanism without the use of complicated and cumbersome electric shunting circuits.

It is well known in the prior art to utilize a pair of arms which are hingedly connected to support the contact electrodes in this type of device. The hinge, in this arrangement, is at a point which is remote from the line joining the two contact electrodes. It is obvious that relative angular motion of one arm with respect to the other will cause the distance between the contact electrodes to vary. When a force-applying means is disposed to operate the two arms, it is clear that the essentials of a mechanism are present which can generate a required welding pressure at the electrodes. While the present invention is associated with this particular type of device, several points of novelty will later appear which distinguish it from any other arrangement which has heretofore been developed.

In the present invention, the welding current is carried through the supporting arms, and also through the components of the hinge, which act as relatively fixed contacts. The principles underlying the operation of electrical contacts clearly establish that the resistance of contacts generally decreases with an increase in contact pressure. It is therefore necessary to maintain adequate pressure at all points where large currents flow across such contact elements as the hinge pin above referred to. The location of the hinge point and the force-applying means relative to the line of contact between the electrodes is such that the load at the hinge and the pressure at the electrodes are maintained in a definite relationship which minimizes the resistance loss (for a given actuating force) due to the passage of current through the entire conductor while maintaining a very compact design. In this manner it is possible to cause the welding current to flow through the supporting arms and hinge pin without the necessity of providing an auxiliary shunt around the hinge. The advantages of such an arrangement are obvious in view of the bulk and expense of manufacturing such auxiliary equipment. Welding electrodes are much easier to maintain when they operate at lower temperatures, and the use of manual grips and control equipment is greatly facilitated if the surrounding structure is kept at approximately room temperature.

In the present invention, the force-applying means is preferably located at a point approximately midway between the hinge point and the line joining the contact electrodes. This arrangement has been found to give the most desirable results when all factors are considered, namely compactness of the overall unit, heat losses generated, and pressure required in the hydraulic or pneumatic actuating circuit.

The particular force-applying means which is utilized in conjunction with this invention is provided with insulating members at certain points to prevent the flow of current through the force-applying means. A cylinder element is preferably rigidly associated with one of the aforesaid supporting arms, the cylinder element containing a piston and suitable access ports for the ingress and egress of the actuating medium. Force is transmitted from the piston to the other of the supporting arms by means of a simple link which connects the piston rod with the other arm.

The flow of welding current through the hinge mechanism of the present invention of necessity creates some heat loss due to the contact resistance between the hinge pin and the supporting arms. Where high welding currents are utilized, the present invention contemplates the removal of the heat so generated by means of a cooling circuit in which a cooling medium is caused to flow within the hinge pin itself. This cooling circuit is preferably formed as part of the general cooling circuit whcih passes through the supporting arms and the contact electrodes.

The following detailed description of this invention will be made with reference to the accompanying drawings, in which:

Figure 1 is a section through a device embodying this invention,

Figure 2 is a section along the plane 2—2 of Figure 1,

Figure 3 is a section along the plane 3—3 of Figure 1,

Figure 4 is a view showing an arrangement for cooling the hinge pin, and

Figure 5 is a section along the plane 5—5 of Figure 1.

Referring to Figure 1, the conductor device is generally indicated at 10, having the contact electrodes 11 and 12. With the shape of these electrodes as shown, the electrode 11 may be termed the welding electrode (under which the weld is performed on the work piece), and the electrode 12 will be referred to herein as the "contact" electrode (cooperating with the structural current-carrying member previously outlined). The conductor 10 essentially comprises the arms 13 and 14 which are hingedly connected at the point 15. The arm 13 is preferably formed as shown substantially in the form of a 90° angle having the horizontal leg 16 and the vertical leg 17. The vertical leg 17 is preferably formed in the shape of a hand grip, and has suitable controls (not shown) attached thereto for activating the cycling mechanism.

The force-applying means which is used to create the welding pressure between electrodes 11 and 12 comprises the piston 18 which operates within cylinder 19. The piston rod 20 transmits the force from hydraulic or pneumatic pressure within chamber 21 to the link 22 which connects rod 20 with the arm 14. The piston 18 is insulated from cylinder 19 by the ring of non-conducting material 23. In a similar manner the piston rod 20 is insulated from the head member 24 of cylinder 19 by a non-conducting ring 25. Fluid pressure is admitted to chamber 21 by means of the conduit 26.

The relative location of the line of contact 27 between the electrodes 11 and 12, the line of action 28 of the force-applying mechanism, and the hinge point 15 are preferably arranged as shown. For convenience, the distance between the line of action 28 and the line of contact 27 will be designated as 29, and the distance between the hinge point 15 and the line of action 28 will be designated as 30. In the preferred form of this invention the distances 29 and 30 are substantially equal. It is obvious that if the distance 30 were decreased relative to distance 29, the load on the hinge pin 31 would be greater than the load upon the electrodes 11 and 12. In any particular type of welding in which this equipment may be used, a general relationship will exist between the resistance and pressure at the electrodes 11 and 12. The relationship between resistance and pressure can be regarded as a constant at the hinge pin 31. It therefore becomes possible to regulate the distances 29 and 30 so as to minimize the overall resistance of the conductor unit 10 for a given pressure supplied to the chamber 21. Experience has indicated that upper limits exist to the welding pressure which is applied to the electrodes due to several factors. The pressure in conduit 26 and the relationship between distances 29 and 30 are therefore adjusted to give the required welding pressure. If the pressure in conduit 26 be increased, the ratio between distances 29 and 30 may be increased which will of course result in an increase in the contact pressure at the hinge pin 31.

To carry away the heat generated by the resistance losses at the various points in the conductor 10, a cooling circuit for carrying water is provided. An intake port is indicated at 32 from which the water is caused to pass through the tube 33 into the interior of the welding electrode 11. Water flowing out from the welding electrode around the exterior of tube 33 is collected in the chamber 34 and passes out through the passage 35. Passage 35 connects with similar passages 36 and 37 which conduct the cooling water up to the point where it passes from the tube 37 to the flexible jumper 38. Jumper 38 conducts the water from the passage 37 to the passage 39 in the arm 14 of the conductor. Passage 39 connects with the cross-passage 40 and the return passage 41. From the return passage 41, the cooling medium traverses the return jumper 42, the return vertical passage 43, and passes through the exit port 44.

Referring to Figure 4, a modified cooling circuit is illustrated which is used in connection with a cooled hinge pin 31a. The jumper 38a in this case conducts the cooling medium to the tube 45 which is disposed in the interior of the hinge pin 31a. Cooling medium which has entered the hinge pin 31a passes out through the jumper 46 into the passage 39a as shown. The return circuit with this arrangement is then similar to that shown in Figure 2.

The devices which are illustrated in the accompanying drawings are for illustrative purposes only, and are not to be considered as limiting the scope of this invention which is defined in the appending claims.

I claim:

1. A bar-welding tool, comprising: a pair of supporting arms of current-conducting material; hinge means of current-conducting material connecting said arms for angular movement in one plane; a contact electrode structurally and electrically attached to each of said supporting arms; and force-applying means for articulating said arms, said means being located in a position between a line joining said contacts and said hinged connection.

2. A bar-welding tool, comprising: a pair of supporting arms of current-conducting material; hinge means of current-conducting material connecting said arms for angular movement in one plane; a contact electrode structurally and electrically attached to each of said supporting arms at the free end thereof for action substantially along a line parallel to the plane of articulation of said arms; and force-applying means for articulating said arms, said means being arranged to provide a force acting substantially parallel to a line joining said contacts and located between said line and said hinged connection.

3. A bar-welding tool, comprising: a pair of supporting arms of current-conducting material forming a U-shaped structure; hinge means of current-conducting material connecting said arms for angular movement in one plane at a point remote from the center of the closed side of said U-shaped structure; a contact electrode structurally and electrically attached to each of said supporting arms at the free end thereof for action substantially along a line parallel to the plane of articulation of said arms; and force-applying means for articulating said arms, said means being arranged to provide a force acting substantially parallel to a line joining said contacts and located between said line and said hinged connection.

4. A bar-welding tool, comprising: a pair of supporting arms of current-conducting material; hinge means of current-conducting material connecting said arms for angular movement in one plane, one of said arms being substantially in the form of a right angle, and the other of said arms being substantially straight; a pin of current-conducting material for said hinge; a contact electrode structurally and electrically attached to each of said supporting arms at the free end thereof for action substantially along a line parallel to the plane of articulation of said arms; force-applying means for articulating said arms, said means being arranged to provide a force acting substantially parallel to a line joining said contacts, and located between said line and said hinged connection; and a circuit for coolant having a section passing axially through at least a portion of the said hinge pin.

5. A bar-welding tool, comprising: a pair of supporting arms of conducting material hingedly connected for angular movement in one plane, the load-carrying members of said hinge being also formed of conducting material; a contact electrode structurally and electrically attached to each of said supporting arms at the free end thereof for action substantially along a line parallel to the plane of articulation of said arms; force-applying means for articulating said arms, said means being arranged to provide a force acting substantially parallel to a line joining said contacts, and located midway between said line and said hinged connection.

ARTHUR T. VAN ECK.

REFERENCES CITED

The following references are of record in the file of this patent:

UNITED STATES PATENTS

| Number | Name | Date |
| --- | --- | --- |
| 1,221,512 | Cluley | Apr. 3, 1917 |
| 2,246,806 | Martin | June 24, 1941 |
| 2,290,344 | Martin | July 21, 1942 |
| 2,293,511 | Lex | Aug. 18, 1942 |
| 2,300,172 | Platz | Oct. 27, 1942 |
| 2,304,975 | Warrender | Dec. 15, 1942 |
| 2,433,018 | Ronay | Dec. 23, 1947 |

FOREIGN PATENTS

| Number | Country | Date |
| --- | --- | --- |
| 665,203 | Germany | Sept. 21, 1938 |